United States Patent
Fraccaroli

(10) Patent No.: US 8,489,119 B1
(45) Date of Patent: Jul. 16, 2013

(54) METHOD AND APPARATUS FOR MEDIATING AMONG A PLURALITY OF PROFILES ASSOCIATED WITH USERS POSITIONED IN A SHARED LOCATION

(76) Inventor: Federico Fraccaroli, Irving, TX (US)

( * ) Notice: Subject to any disclaimer, the term of this patent is extended or adjusted under 35 U.S.C. 154(b) by 0 days.

(21) Appl. No.: 13/572,617

(22) Filed: Aug. 11, 2012

(51) Int. Cl.
*H04W 24/00* (2009.01)

(52) U.S. Cl.
USPC .......... 455/456.3; 455/412.2; 455/414.2; 455/420; 455/456.1; 455/456.2; 379/201.1; 379/201.06

(58) Field of Classification Search
USPC ..... 455/404.2, 407–408, 412.1, 414.1–414.2, 455/550.1, 556.2, 456.1–457, 412.2, 414.1–414.3, 418–420; 379/201.1, 201.06
See application file for complete search history.

(56) References Cited

U.S. PATENT DOCUMENTS

| | | | |
|---|---|---|---|
| 5,945,988 A | 8/1999 | Williams | |
| 6,438,579 B1 | 8/2002 | Hosken | |
| 6,530,083 B1 | 3/2003 | Liebenow | |
| 6,563,430 B1 * | 5/2003 | Kemink et al. | 340/8.1 |
| 6,791,467 B1 * | 9/2004 | Ben-Ze'ev | 340/12.25 |
| 7,134,130 B1 | 11/2006 | Thomas | |
| 7,881,733 B2 * | 2/2011 | Staton et al. | 455/456.6 |
| 7,925,723 B1 | 4/2011 | Amidon | |
| 2002/0034954 A1 * | 3/2002 | Nohara et al. | 455/456 |
| 2002/0095333 A1 * | 7/2002 | Jokinen et al. | 705/14 |
| 2008/0181172 A1 * | 7/2008 | Angelhag et al. | 370/328 |
| 2009/0125464 A1 | 5/2009 | Shi | |
| 2009/0239587 A1 * | 9/2009 | Negron et al. | 455/566 |
| 2010/0223555 A1 * | 9/2010 | Zellner et al. | 715/733 |
| 2010/0229192 A1 | 9/2010 | Marilly | |
| 2010/0319052 A1 | 12/2010 | Ferren | |

* cited by examiner

*Primary Examiner* — Vladimir Magloire
*Assistant Examiner* — Babar Sarwar

(57) ABSTRACT

According to one embodiment of the present invention, a method is presented for mediating among a plurality of datagrams containing data, settings or preferences to produce ambience settings applicable to a location area that is shared by a plurality of users wherein at least one of said users is associated to one datagram among said plurality of datagrams.

20 Claims, 6 Drawing Sheets

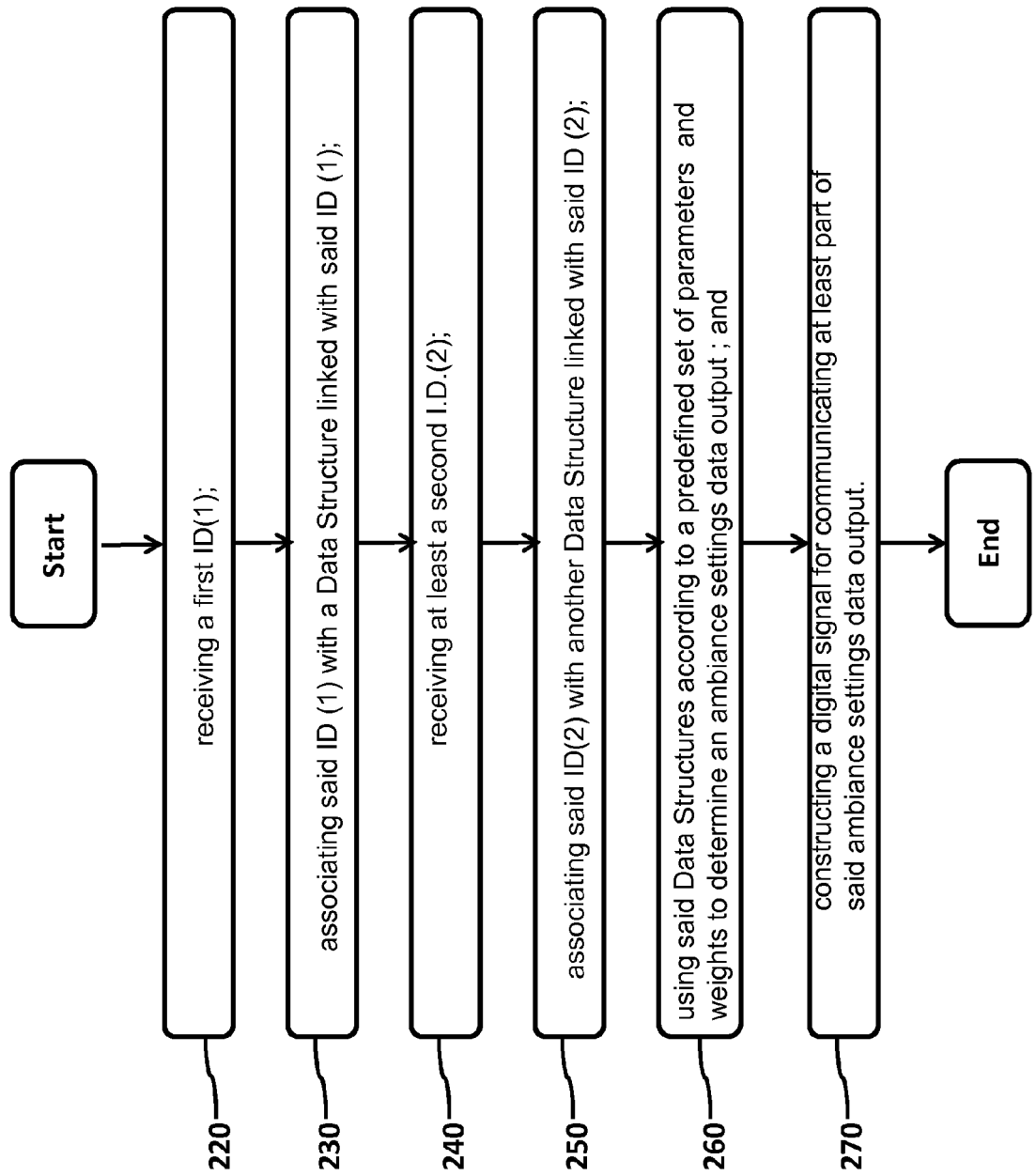

User Set of Parameters 300

| Ambiance Classes 310 | Classes Preferences 320 | General User Data 330 | General User Preferences 340 |
|---|---|---|---|
| Music — 311 | Genres<br>• Alternative country<br>• Jazz<br>Specific Songs<br>My Way (Sinatra)<br>Specific Singers: Sinatra<br>User Library & Preferred Playlist (e.g. retrieved over the network and stored on cloud or on Service Server 100.) — 322 | • User Tier: (1,2,3) — 331<br>• User popularity index — 332<br>• User's ID Duration within area — 333<br>• Paying User: Y/N — 334<br>• Analytics User's Profile (generated by analyzing user's activity.) — 335<br>• Inferred User Profile (generated by analyzing similar users' profiles and choices.) — 336<br>• Credit card number — 337<br>• Date of Birth — 338<br>• Gender: M/F — 339 | Exclusions<br>• Latin<br>• Classical — 341 |
| Light Ambiance — 312 | Soft lights | | |
| Ceiling Fan — 313<br>Temperature — 319 | Medium speed<br>Max 80 – Min 70 | | |
| TV Channels — 314 | ESPN, CNN | | |
| Movies or Mixed Digital Content 315 | User library<br>(Retrieved over the network from personal computer) | | Exclusions<br>• Kids programs — 342<br>• Cartoons<br>Mixed Digital Content Parameters<br>Romance (1-10): 3<br>Action (1-10): 5<br>Adventure (1-10): 7<br>Thriller (1-10): 3<br>Sexual explicitness (1-10): 5<br>Comedy (1-10) : 2 — 343 |
| Games — 316 | Preference<br>Level: advanced<br>No advertisement | | |
| Augmented Reality — 317<br>• Shared — 318<br>• Personal | Priority — 321<br>Traffic lights: priority 1 | | |

FIGURE 3

Operator Set of Parameters 600

| Ambiance Classes | Classes Preferences | General Operator Settings | General Operator Preferences |
|---|---|---|---|
| Music | Genres<br>•Alternative country<br>•Jazz<br><br>Specific Songs<br>Let it be (Beatles)<br><br>Specific Singers: Ray Charles<br><br>User library & preferred playlist i.e. retrieved over the network and stored on cloud or on Service Server 100. | • Preferred Users : ID (1) , ID (2)... — 631<br>• Date of Birth: Later than 1970 — 632<br>• Gender: F — 633<br>• Timers — 634 | Exclusions<br>• Latin<br>• Classical |
| Light Ambiance | Soft lights | | |
| Ceiling Fan Temperature | Medium speed<br>Min 65 – Max 75 | | |
| TV Channels | Channels<br>ESPN, CNN | | Exclusions<br>• Kids programs<br>• Cartoons<br>Sexual explicitness (1-10): below 5. — 643<br>Content Rating — 644 |
| Movies or Mixed Digital Content | Operator Library<br>(Retrieved over the network from personal computer) | | |
| Games | Preference<br>Level: advanced<br>No advertisement | | |
| Augmented Reality<br>•Shared<br>•Personal | Priority<br>Traffic lights: priority to premium IDs and Public Workers IDs. — 641 | | |

FIGURE 6

METHOD AND APPARATUS FOR MEDIATING AMONG A PLURALITY OF PROFILES ASSOCIATED WITH USERS POSITIONED IN A SHARED LOCATION

TECHNICAL FIELD

The present application relates generally to a method, a system and an apparatus to mediate among a plurality of user datagram containing data profiles, settings and preferences associated with different users positioned within a shared location area.

BACKGROUND

As an example of how public places managed shared entertainment, jukeboxes came into use in the United States around 1940. These machines were installed in taverns. For a fee, patrons could pick their favorite songs from a limited selection of songs available. Song popularity counters told the owner of the machine the number of times each record was played, with the result that popular records remained, while lesser-played songs could be replaced. Nowadays jukeboxes have almost disappeared in the wake of digital technology and miniaturization.

There are many scenarios in which a plurality of people congregate and may spend some time together; sometimes the settings are public places like a restaurant, a movie theater or a bar. Some other times the settings are more private: a private house, a conference, a classroom or a party. Usually, in all of these scenarios customers, guests and passersby collectively enjoy (or alternatively put up with) the digital content or settings that are provided by the owner or the operator of the premises. For example, in a bar the operator selects the music, the TV channels, the temperature, the ambiance and other settings. Those choices and preferences set the tone of the public place by attracting certain kind of customers while deterring others. This is also true in private houses. For example, one of the members of a family at home interacts with a thermostat and sets the temperature on behalf of everybody.

The progress in miniaturization of electronics, improved batteries and computing capability has made it possible the creation of portable devices that have the capability of delivering different kinds of digital media content to users. Usually these portable devices interface with a software program that resides on computers; this software is capable of managing the digital content and the preferences that a particular user may have. For example, iTunes is a digital content manager application that allows a user to buy and manage audio and video on a personal computer. Many alternatives to iTunes do exist for managing digital content. Users can organize their music into playlists within one or more libraries, edit file information, record Compact Discs, copy files to a digital audio player, purchase music and videos through a built-in music store, download free podcasts, back up songs, run a visualizer to display graphical effects synchronized with the music, and encode music into a number of different audio formats.

Libraries are databases of digital media that organize media content. Users can create and maintain them on the memory of a computer or a portable device for different purposes such as to make the digital content and playlists available to other applications stored on the computer or generally a device. Portable user devices are often used to play digital content for the fruition of a single user who is carrying said multimedia device with him and is usually wearing, earphones, headphones, earpieces or other similar accessories.

Cloud computing is the delivery of computing and storage capacity as a service to a community of end-recipients. The name comes from the use of a cloud-shaped symbol as a generalization for the complex infrastructure it contains in system diagrams. Cloud computing entrusts services with a user's data, software and computation over a network. Cloud computing has made possible the real time retrieval of data and content. For example, if a user is at a party he can share a song by retrieving it from his or her library in the cloud. When a song is shared, the digital content manager software can stream the song and conventionally it will not save it on the local hard drive in order to prevent unauthorized copying. Recently Google put on the market a device called Nexus Q that, when in guest mode, allows guests at a party via an Android portable device to retrieve songs from their private libraries on Google's cloud and manually queue them into a playlist. These songs are then played locally at the users' location.

Digital technology has also made it possible for digital media works to deviate from an official copy. For example, moviemakers often film alternate endings. These endings are often excluded from the official theatrical version and can subsequently be included as a special feature in the film's DVD release. These alternate endings are a special type of deleted scene. In a public performance of the official copy, the publisher or the movie director usually decides which one of the alternate scenes are included and which one are skipped.

Current wireless technologies, such, as for example, cellular 3G, 4G, WIMAX and non-cellular WLAN, Bluetooth, ZigBee and RF-ID, with their improved speed of data, efficiency and range, provide opportunities for growth, customer satisfaction and efficiency. General positioning technologies have also evolved. Some of these technologies are more suitable for outdoor positioning. These include GPS (Global Positioning Technology), databases mapping locations of base stations/access points, multilateration and cell IDs strength measurement. Other technologies are more suitable for indoor locationing. Examples are choke points concepts, grid point concepts, long-range sensors concepts, angle of arrival, time of arrival, received strength indication and inertial measurements, RF-ID cell, UWB, Infrared, Visible Light Communication and Positioning techniques and ultrasound. These short and long-range communication technologies, together with indoor and outdoor positioning technologies provide an opportunity to build backend software, applications and devices that can maximize the effectiveness of the knowledge a user's apparatus location by the system.

A geo-fence is a virtual perimeter for a real world geographic area. A geofence can be dynamically generated as in a radius around a point location that could be stationary or mobile. A geofence can be a predefined set of boundaries connecting points expressed by latitude and longitude, like neighborhood boundaries. Geofencing has been made possible by the introduction of sufficiently precise locationing techniques like, for example, the GPS technology or the multilateration technology and by the miniaturization of electronic components that have made the GPS a standard feature in mobile phones and portable electronics in general.

SUMMARY

Various aspects of examples of the invention are set out in the claims.

According to a first aspect of the present invention a method comprises: receiving a first ID (1) associated with a location area and linking said ID (1) with a data structure coupled with said ID (1); receiving a second ID (2) associated with the same said location area and linking said ID (2) with another data structure coupled with said ID (2); determining an ambience settings data output for said location area using said data structures according to a predefined set of parameters; and generating a digital signal for communicating at least part of said ambience settings data output.

According to a second aspect of the present invention an apparatus comprises: at least one processor; and at least one computer-readable medium including computer program code. The at least one computer-readable medium and the computer program code are configured to, with the at least one processor, cause the apparatus to perform at least the following: receiving a first ID (1) associated with a location area and linking said ID (1) with a data structure coupled with said ID (1); receiving a second ID (2) associated with the same said location area and linking said ID (2) with another data structure coupled with said ID (2); determining an ambience settings data output for said location area using said data structures according to a predefined set of parameters; and generating a digital signal for communicating at least part of said ambience settings data output.

According to a third aspect of the present invention, a computer software system has a set of instructions stored in a computer-readable medium for controlling at least one general-purpose digital computer in performing desired functions comprising a set of instructions formed into each of a plurality of modules, wherein each modules comprises: a process for receiving a first ID (1) associated with a location area; a process for linking said ID (1) with a data structure coupled with said ID (1); a process for receiving a second ID (2) associated with the same said location area; a process for linking said ID (2) with another Data Structure coupled with said ID (2); a process for determining an ambience settings data output for said location area using said data structures according to a predefined set of parameters; and a process for generating a digital signal for communicating at least part of said ambience settings data output.

BRIEF DESCRIPTION OF THE DRAWINGS

For a more complete understanding of example embodiments of the present invention, reference is now made to the following descriptions taken in connection with the accompanying drawings in which:

FIG. 2 is an exemplary flow diagram illustrating a process for determining ambiance settings when at least two IDs associated with two users have checked in;

FIG. 3 provides an example of a data structure representing a User Set of Parameters illustrating various embodiments of the present invention;

FIG. 6 provides an example of a data structure representing an Operator Set of Parameters illustrating various embodiments of the present invention.

DETAILED DESCRIPTION OF THE DRAWINGS

An example embodiment of the present invention and its potential advantages are understood by referring to FIGS. 1 through 6 of the drawings.

Figure 1:
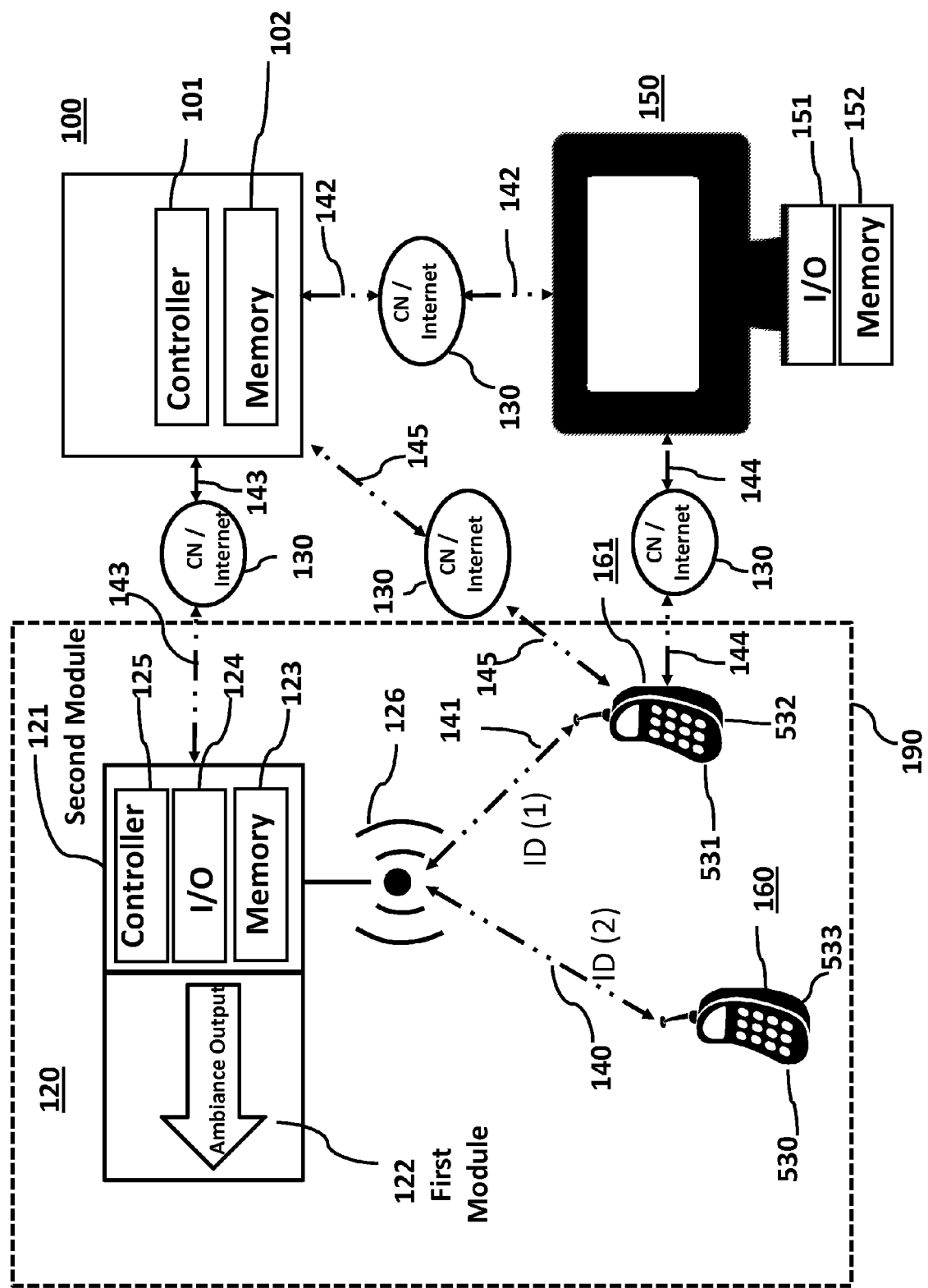
FIG. 1 provides a schematic illustration of various example embodiments of the present invention.

FIG. 1 describes a possible embodiment of the invention. User Equipment 161 (UE) may be located within an Area 190, which may represent the area where a Shared Ambiance Apparatus 120 (SAA) delivers digital output controlling "ambiance setting" affecting users located in with Area 190. These settings may include a multitude of possibilities. For example, users located in a common location may all listen to the same music, share the same temperature, ceiling fans and lights settings, and share the vision of the same TV channels, a movie or generally digital content. For example, "ambience settings" may comprise augmented reality digital content that is shared among users in a location as will be explained with reference to FIG. 3.

Ambience and ambiance shall have the same meaning.

Digital content is also organized according to various classes. For example, associations like the Classification and Rating Administration ("CARA") issues ratings for motion pictures exhibited and distributed commercially to the public in the United States, with the intent to provide parents information concerning the content of those motion pictures and to aid them in determining the suitability of individual motion pictures for viewing by their children. The viewers of a movie or a TV program or digital content in general are sharing a common CARA rating. Ratings and other classes of digital media are part of what are broadly defined as ambiance settings. Ambiance settings in general are settings that may affect at least one of the traditionally recognized methods of perception of one or more users collocated within a common area. However, in some implementations, users may not all be equally affected within the same area by common ambience settings.

Digital technology is expanding the range of possible shared content. For example, augmented reality (AR) is an area of technology in great expansion. Augmented reality is a live, direct or indirect, view of a physical environment whose elements are amplified by computer-generated sensory input such as sound, video, graphics or GPS data. It is connected to a more inclusive concept called mediated reality, in which a view of reality is adapted (sometimes diminished rather than augmented), by a computer. Augmentation is conventionally real-time and in semantic context with environmental elements. AR technology, when integrated with computer vision and object recognition, makes the information about the nearby real world that a user experiences interactive and modifiable. Users in a common location may share AR sensory perceptions and these AR sensory perceptions are also included in the definition of ambiance settings.

With reference to FIG. 1, in one possible implementation, UE 161 may be delivering via a Wireless Link 141 a user ID (1) to Antenna 126. The abbreviation ID (1) shall refer to a first user's ID since Antenna 126 can receive more than one ID. Said transfer of ID may occur via a multitude of wireless methods including but not limited to general present cellular and non-cellular wireless technologies such as 3G and 4G or WLAN, Bluetooth, ZigBee or RF-ID. As described above, Area 190 represents the area served by a Shared Ambience Apparatus (SAA) 120. This means that all the users within the Area 190 may be affected by ambience settings provided by said Shared Ambience Apparatus 120. Area 190 may or may not coincide with the area in which user equipment is capable of exchanging data with Antenna 126 (radio horizon area or more generally "check in area"). A check in area can be the area in which said UE 161 is accounted for as present in the area. SAA 120 may modify its output (as instructed by Server 100) to account for said presence. To simplify FIG. 1, Area 190 has been depicted as being both, the check in area and the area where users collocated within said area can experience common or synchronized ambience settings. The person skilled in the art will recognize that this is just a simplification and certain implementations may differ.

For the purpose of the present invention, the checking in into a location can occur automatically or by means of user's input (manual check in). For example, UE 161 can automatically transmit ID (1) using an automated Bluetooth connection. For example, a Bluetooth module in UE 161 could, at set intervals, transmit ID (1) to Antenna 126. The Bluetooth connection may use OBEX (abbreviation of OBject EXchange, also termed IrOBEX) or any other protocol to exchange binary objects and IDs between UE 161 and SAA 120.

The person skilled in the art will recognize that many different techniques can be used to account for (or establish) the presence of a user within a check in area. For example, UE 161 itself can establish the presence by using a GPS module or any other locationing techniques. An application running on UE 161 and stored on Memory 532 may request the position data from a GPS module and compare it with the boundaries of a predefined Geofence. In another implementation, UE 161 may send its position via Network Connection 145 to service Server 100. An algorithm stored on Memory 102 may compare said position within certain predefined geofence boundaries defining Area 190. If the position is within the boundaries the system may consider UE 161 as checked in. In another implementation the checking in may occur by means of a manual selection of the user. For example, a user of UE 161 may be given a list of nearby places that are equipped with a Shared Ambience Apparatus 120 (SAA) (via Network Connection 145) and he may be prompted to check into one of these places. In other settings, the receiving of a WLAN SSID by UE 161 may trigger an application running on Memory 532 of the device to send a message via Network Connection 145 and Core Network/Internet 130 to Service Server 100 and cause the check in into AREA 190. The SSID differentiates one WLAN from another, so all access points and all devices attempting to connect to a specific WLAN must use the same SSID. Usually a public place or private household do have a unique SSID.

Network Connections 142, 143, 144, 145 and Core Network/Internet 130 do represent means capable of collecting and transporting digital information from and to Service Server 100, SAA 120, UE 160 and UE 161 and Workstation 150 including but not limited to wireless, cable, base stations, core network or other equipment. For the sake of clarity, the detailed description of this equipment has been omitted but the person skilled in the art will be able to retrieve detailed and enabling descriptions of the related telecommunication technologies by using, for example, one of the many telecommunications standards specifications available from standardization bodies like TIA, ETSI or IEEE.

In one implementation involving dedicated equipment, two different modules may compose said SAA 120. A First Module 122 could be equipment dedicated at delivering ambiance settings. Music and traditional digital content are just a subset of what this application names generally as ambience settings. For the sake of clarity and simplicity, the present application will often refer to examples of digital content in the domain of music. The person skilled in the art will understand that this is only one of the possible examples. In addition, digital content is not limited to discrete pieces such as a traditional movie or a song but it may include subparts of digital content that assembled together may form one of the many possible versions of a digital work. Said version may for example show certain scenes and skip others according to the inputs received from Service Server 100.

The person skilled in the art will recognize that traditional digital content (or more generally ambience settings) may acquire features that are unique and tailored to the particular group of people who have checked in (the audience) by means of an algorithm running on Service Server 100. Said algorithm may mediate among various users' profiles containing data and preferences stored in a datagram as the one described in FIG. 3. The result, in one possible implementation, can be a weighted compromise between all the possible preferences that the various users can explicitly indicate, the data that at least one of the system's algorithms may infer, and the constrains that an operator of said SAA 120 may impose.

First Module 122 is dedicated to deliver ambience settings determined by Service Server 100. It may take many different forms all of which will serve the common purpose of delivering ambience settings mediated among users who are recognized by the system to have checked into Area 190. In one possible implementation, First Module 122 can be digital entertainment equipment capable to adapt its output to the inputs of Second Module 121 (for example alternate endings or scenes or content rating). In other implementations it can be a thermostat, music boxes, a traditional television adapted to receive digital channels, lightning equipment, ceiling fans or other.

Second Module 121 can be dedicated to the interface with the operator and to the exchange of information with user equipment (such as UE 161 and UE 160) and remote Service Server 100. Said Second Module 121 may include a Controller 125 capable of interpreting the information received from Service Server 100 via a Network Connection 143 and cause First Module 122 to deliver ambience settings in accordance with instructions received from Service Server 100. Second Module 121 may also include an Input Output (I/O) module 124 and a Memory 123. In a possible implementation, Controller 101, contained in Service Server 100, may determine the output of ambience settings to be delivered by First Module 122 by using a User Set of Parameters 300 and an Operator Set of Parameters 600 in conjunction with at least one algorithm stored on Memory 102. Details and examples of said User Set of Parameters 300 and said Operator Set of Parameters 600 will be provided while describing FIG. 3 and FIG. 6. User Set of Parameters 300 will generally refer to preferences or data relative to a user associated with a user ID; said preferences and data can be enclosed in datagrams as the ones described in FIG. 3.

More than one ID can check in into Area 190. In FIG. 1, user ID (1) can be transmitted via a Wireless Link 141 from UE 161 and another ID (2) can be sent via Wireless Link 140 from UE 160 to Antenna 126. ID (1) and ID (2) can be associated with two different user set of parameters related to two different users. Said user set of parameters can be enclosed in two different datagrams each one of them similar to the one described in FIG. 3 and stored on Memory 102 or Memory 123.

An Operator Set of Parameters 600 will often refer to preferences and data contained in a datagram relative to a person who is the operator of said Shared Ambience Apparatus 120 (SAA). Said operator could for example be the proprietor of a sports bar or the owner of a restaurant or the operator of a movie theater or the owner of a private household. Second Module 121 may also contain an Input/Output (I/O) Module 124 and a Memory 123. Said I/O Module 124 may serve the purpose of creating and modifying said Operator Set of Parameters 600 to be stored in Memory 123 or to be sent via Network Connection 143 and Core Network 130 to Service Server 100 and then stored in Memory 102. Service Server 100 may comprise at least a Controller 101 and a Memory 102. Said Memory 102 may host computer code and at least an algorithm configured to determine the commands that will produce the ambiance output to be delivered by said First Module 122.

The person skilled in the art will recognize that the ambience settings output can be the result of determinations made by one or more algorithms. For example, if both User Sets of Parameters and the Operator Set of Parameters reside on Memory 102 a single algorithm, also possibly residing on Memory 102, can determine the ambiance setting output. Alternatively, the ambiance settings output can be calculated by using more than one algorithm in parallel or in sequence. For example, one algorithm on Memory 102 could be in charge of weighting all the User Sets of Parameters and another algorithm on Memory 123 could be in charge of factoring in the Operator Set of Parameters.

In one explanatory example when only UE 161 sends ID (1) via Wireless Link 141 said ID (1) could be sent over to Service Server 100 via Network Link 143. An algorithm residing on memory 102 may determine the output of digital content by using a User Set of Parameters 300 associated with said I.D (1). In another example, if also an Operator Set of Parameters 600 is active and is stored on Memory 102 the algorithm may use both said Operator Set of Parameters 600 and said User Set of Parameters 300 to determine the digital command that will produce the ambiance output to be delivered by said First Module 122.

In another explanatory example, not only UE 161 sends ID (1) via Wireless Link 141 but also UE 160 sends ID (2) via Wireless Link 140. Said ID (1) and ID (2) may then be sent from Second Module 121 to Service Server 100 via Network Connection 143. The algorithm residing on Memory 102 may now determine the output of ambience settings by using a User Set of Parameters 300 associated with said ID (1), another different User Set of Parameters associated with said I.D (2) (also similar in structure to the one represented in FIG. 3) and an Operator Set of Parameters 600. The person skilled in the art will recognize that in many settings the number of received IDs may be high especially in crowded places. Every received ID can be associated with a specific user set of parameters and the algorithm may mediate among all the users' set of parameters using different weights and criteria.

In one implementation, the weight associated with a certain ID may increase with the increasing of the duration of the permanence of that ID in the checking in area. In addition, the algorithm may consider certain patterns and recurrences. For example, if certain IDs are a recurrent presence in the check in area in certain days of the week or time windows during the day, the algorithm may consider said recurrences and proactively generate ambient settings commands that will account for said recurrences.

In one implementation, said algorithms and computer code can be residing in Memory 102 and may determine the output of ambient settings according to different weights for different users. For example, if ID (1) is associated with a paid premium service, the datagram associated with ID (1) may carry a higher weight as compared to the datagram associated with ID (2). As a further explanatory example, certain users IDs may progressively acquire higher weights if the system perceives an increasing duration of their permanence within the check in area. The analytics of the duration data related to certain IDs in the check in area may promote certain users as regulars of the business establishment that is equipped with said Shared Ambience Apparatus 120 (SAA) and give them a higher and preferential status. As another example, said operator of said Shared Ambience Apparatus 120, who in a possible implementation is also the business operator of the premises, may sponsor regular clients and manually confer them a higher status. Hierarchy among IDs can also be associated with the amount of money spent by a user associated with a particular ID so that premium clients can enjoy ambience settings that are more customized to their taste.

In another possible implementation, a higher weight can be given to an ID that receives positive feedback from other users. For example, user of UE 161 that is associated with ID (1), while listening in real time to certain digital content being provided via First Module 122 within Area 190, may give positive feedback by using an Input Output Module 531 of UE 161. User of UE 161 may send over Network Connection 145 or Wireless Link 141 a digital signal indicating his or her approval of the digital content being played. As a consequence, ID (2) which is associated with user of UE 160 and a datagram of parameters and data resulting in the digital content that is being played (or more generally ambience settings), may gain more weight in upcoming selections of digital content and ambience settings in general.

In one implementation, Workstation 150 (accessible to user of UE 161 since user of UE 161 can also at times be the user of Workstation 150) may contain digital content files, such as music, organized in libraries and contained in Memory 152, that can be downloaded by user of UE 161 on his device. UE 161 may synchronize with Workstation 150 via Network Connection 144 said digital content. The same digital content can be present on both Memory 152 of Workstation 150 and Memory 532 of UE 161 as it is the case in some current implementations. Said digital content or the associated libraries can also be sent over to Service Server 100 from Workstation 150 via Network Connection 142 or directly from UE 161 via Network Connection 145.

In a possible implementation, only libraries and indexes are sent over to Service Server 100 while the digital content can be present on Service Server 100 or can be retrieved by Service Server 100 and can be associated with said libraries and indexes. This solution may become more and more popular in the future considering the fast pace development of cloud services. In another implementation, there is no need for UE 161 or Workstation 150 to store digital content. All the digital content can be stored on servers and delivered via streaming on demand; for example, digital content can be streamed from Service Server 100 directly to Shared Ambience Apparatus 120 (SAA) via Network Connection 143.

The person skilled in the art will recognize that many variations to FIG. 1 are possible. For example, user of UE 161 and Workstation 150 can send or update his or her User Set of Parameters 300 via Input/Output Module 151 or Input/output Module 531. Network Connections 142, 143, 144 and 145 can generally be cables, wireless connections, or any other communication channel, as long as capable of convening digital information. Finally, with the fast development of electronics and the growth of computing, network and memory capacity, Workstation 150 may become unnecessary and all the operations and selections can be performed directly via UE 161 by communicating directly with Service Server 100 or Shared Ambience Apparatus 120 (SAA).

In one implementation First Module 122 can deliver not only digital entertainment such as music (or ambience settings in general) but also an indication of the ID and the identity of the user whose preferences and habits have caused the ambience settings output at a particular instant. For example, the name or the picture of user of User Equipment 161 can be shown on a screen in Area 190 as depicting the user who should be credited for the ambience settings output being delivered to users within Area 190 during a determined moment in time.

The person skilled in the art will recognize that what I call a Shared Ambience Apparatus 120 (SAA) in one possible implementation can be an apparatus as simple as another general-purpose computer Workstation 150 having or connected to music boxes, a video screen, or any other apparatus capable of delivering sensory stimulations to end users. In other settings, a Shared Ambience Apparatus 120 (SAA) is a dedicated apparatus if the outputs are ambiance settings that require dedicated equipment.

In addition, Shared Ambience Apparatus 120 (SAA) may or may not be composed of two separate modules (First Module 122 and Second Module 121). In fact, the functions performed by those two modules can be combined in to a single apparatus.

In another implementation that is going to be further explained with reference to FIG. 3, there is no need for said Shared Ambience Apparatus 120 (SAA) to be located within Area 190. As discussed, for the sake of convenience and simplicity, Area 190 has been described both as 1) the area in which ambience settings affect users located within that area and 2) as the area in which the system will account for the presence of a user in generating the ambience settings (if his user equipment reports itself as being within the check in area). Those two areas can be separate and distinct even though in some cases and implementation those areas may overlap. The person skilled in the art will understand that this is a simplification.

In order to explain a case in which the presence of a Shared Ambience Apparatus 120 (SAA) is likely be located outside Area 190 we can refer to augmented reality technology. Augmented reality can be "shared" or "personal". In case of shared augmented reality, users collocated within the same area, will experience the same (or at least synchronized and interdependent) ambience settings while using or wearing augmented reality equipment. If augmented reality is "personal" then users collocated within the same area or location may experience ambience settings that are independent and not synchronized.

A possible implementation of this concept can be an augmented reality traffic light. As an example, if two or more cars (or their drivers), are equipped with augmented reality equipment and are about to approach an intersection from different directions they all may check in into the same check in zone. In that situation, a shared (or synchronized) augmented reality digital content can be delivered to all of the cars (or drivers) so that the need for a physical traffic light apparatus may disappear. The digital signal inducing the representation of a traffic light via augmented reality equipment may come wirelessly from Core Network/Internet 130 equipment positioned outside Area 190, perhaps a base station working accordingly to a 4G standard. In this case, what I named SAA 120 can be located outside Area 190 and the ambience settings are augmented reality representations generated upon the reception of wireless information for fruition within Area 190. Alternatively, First Module 122 of said SAA 120 could be considered the very same augmented reality equipment that is personal or specific to each driver or car.

In another embodiment, a traffic light apparatus can be a physical objet and it may receive ambience settings from Service Server 100; in this case, the ambience settings can simply be the green, yellow and red traffic indications. In this case, SAA 120 can be located within Area 190 and can be a remotely operated traffic light that may consider real time preferences, settings and situations as described above.

With reference to this scenario, the algorithm may use different kind of parameters so that certain drivers may receive preferential treatment according to various scenarios. As non-limiting examples: drivers can pay to receive a preferential tier; drivers may receive a preferential treatment if they check in more frequently; older drivers or any public service driver may also be preferred. The possible scenarios are extremely numerous.

FIG. 2 represents a possible method embodiment of the present invention that can be implemented, for example, by means of a Service Server 100. Said method may comprise: receiving a first ID (1) (step 220); associating said ID (1) with a Data Structure linked with said ID (1) (step 230); receiving a second ID (2) (step 240); associating said ID (2) with another Data Structure linked with said ID (2) (step 250); using said data structures according to a predefined set of parameters and weights to determine an ambiance settings data output (step 260); and constructing a digital signal for communicating at least part of said ambiance settings data output (step 270).

In one possible alternative implementation that is different from the one described in FIG. 1 (where Service Server 100 is the apparatus configured to execute the method described in FIG. 2 above), Second Module 121 may also execute the method described in FIG. 2. In this implementation, Memory 123 may have received and is storing the data structures associated with the various IDs. It may also store application software comprising the algorithm configured to determine ambience settings. In this possible implementation, said Shared Ambience Apparatus 120 (SAA) would be an autonomous unit capable of determining ambience settings and Service Server 100 would be not necessary.

FIG. 3 represents a possible User Set of Parameters 300. This datagram contains information about user's preferences, settings and data. Column 310 describes non-limiting examples of some Ambiance Classes. For example Music 311, Light Ambiance 312, Ceiling Fan 313, Temperature 319, TV Channels 314, Movies or Mixed Digital Content 315, Games 316, Augmented Reality 317 and in particular Shared Augmented Reality 318. Shared Augmented Reality 318 means that users collocated within the same area will experience the same or synchronized ambience settings and sensory inputs via their augmented reality equipment. Synchronized means that the ambience settings for the users may not be the same but they will be interdependent. For example, a user at a traffic light may see a red light while another may see a green light depending on their position and orientation.

Column 320 describes Class Preferences namely personal libraries or details of preferences for each Ambiance Class 310. These preferences usually derive from explicit settings of the user. For example, within Music 311, a user can indicate his or her preferred genres, singers or songs. User Libraries & Preferred Playlist 322 can also be retriever from either Workstation 150 or UE 161 and can be stored in User Set of Parameters 300.

With reference Discrete and Mixed Digital Content 315, we refer here to audiovisual digital content that for example can be retrieved from the cloud and that can be streamed to users within Area 190, in the same way as Music 311. This class comprises both discrete (a traditional movie for example) and audiovisual digital content that may morph and vary (mixed digital content) according to the audience's preference. For example, Filed 343 may list various preferences for genres. Preferences can be expressed by a numerical value. In one implementation, an algorithm that may be running on Service Server 100 will consider said preferences and may adapt the digital content to said preferences. For example, a movie can be a weighted result of the preferences of those users who have checked into Area 190. Second Module 122 may accordingly show certain scenes while skipping other scenes and in so doing build a digital content work that is unique to the audience.

Column General User Data 330 represents an example of data that can be stored in a datagram and that can be used by a software algorithm (stored in Memory 102 or on Memory 123) to create ambience settings output. These fields generally store user's data that may not always be the direct result of user's choices but that are rather data that may be inferred by the system by analyzing analytics pertaining to the user or that are factual data like gender or date of birth.

Certain IDs may enjoy a premium status or a higher User Tier 331. A premium status may derive from being a regular in a certain public place (for example because of the duration of their permanence in Area 190) or from a manual entry by the operator of SAA 120 who wants to support a subset of his clients. Higher User Tier 331 means that the User Set of Parameters 300 associated with that particular ID may have a superior weight when factored in by said software algorithm that is in charge of determining the ambience settings output for Area 190.

Positive feedback to digital output being played (or ambience settings in general) associated with a particular ID may also play a role. For example, user of UE 160 that is associated with ID (2) while experiencing in real time within Area 190 certain ambience settings that are associated to ID (1) can give positive (or negative) feedback by using an Input Output Module 530 of UE 160. This may affect the User Popularity Index 332 field associated with ID (1).

A User Persistence 333 filed indicates how long an ID has been within the checking in area. The algorithm may put a higher weight on IDs that have been in the area for a long time as compared to others that have just checked in. This field may also capture patterns of regular clients and promote regulars to a higher User Tier 331.

A Paying User 334 field captures the information that certain users may be willing to pay for a premium service so that their IDs can have a higher User Tier 331 when computed in by an ambience settings algorithm.

An Analytics User's Profile 335 field captures inferences, patterns and recurrences related to a user. For example, a user can be a regular on certain days of the week or time windows of the day. The system may predict his future presence and generate an ambience output tailored to that user in certain time windows.

The system may also correlate users who have similar preferences. The system may infer and attribute preferences to users even if those preferences have not been explicitly expressed. This is captured in the Inferred User Profile 336 field.

In some implementations, a user may decide to charge his credit card for the option of directing said Shared Ambience Apparatus 120 (SAA) to deliver a determined ambience settings output such as playing a selected piece of digital file, a song for example. This may overrule a User Tier 331 field or other parameters. The data associated with a credit card can be pre-stored into a Credit Card Number 337 field. This may make SAA 120 the equivalent of a modern jukebox. This example is not limited to music but it may generally be applied to any ambience settings.

A Date of Birth 338 field can be used to store data to be used for a variety of purposes. For example to derive CARA ratings that may be applied as a minimum common denominator to the ambience settings output. For example, if there is an ID that is associated with a minor among those IDs that have checked in into Area 190 then the ambience settings output may be tailored to a minor audience. In addition, places may privilege older or younger patrons: the algorithm may discriminate by using Date of Birth 338 field.

The algorithm can also use a Gender 339 field to discriminate between different kinds of clientele. For example, if the operator of a commercial establishment thinks that attracting more women would benefit his business then he may task an algorithm with privileging IDs associated with users who are females. SAA 120 may consequently deliver ambience settings more attuned with a female taste.

Column General User Preferences 340 may list preferences that are more specific and detailed as compared to those described in Column 320. For example, it may store exclusions for music genres, certain discrete pieces of digital entertainment or TV channels as in Field 341 and Field 342. Exclusions can also be more general ambience settings. For instance, a user can exclude room temperatures below 70 Fahrenheit (° F.). The algorithm may consider these exclusions while determining the ambience settings output.

Field 343 can contain preferences for genres of digital entertainment. For example, a movie can rarely be categorized in absolute terms as belonging to a particular genre but it is always a mix of genres and situations. As a non-limiting example, if a user indicates his preferences for movies, by distributing a fixed amount of units among different genres and features categories, then an algorithm compiling a variable digital data entertainment output, (a subclass of ambiance settings), may tailor said output to the specific audience by including or excluding scenes and features.

Figure 4:
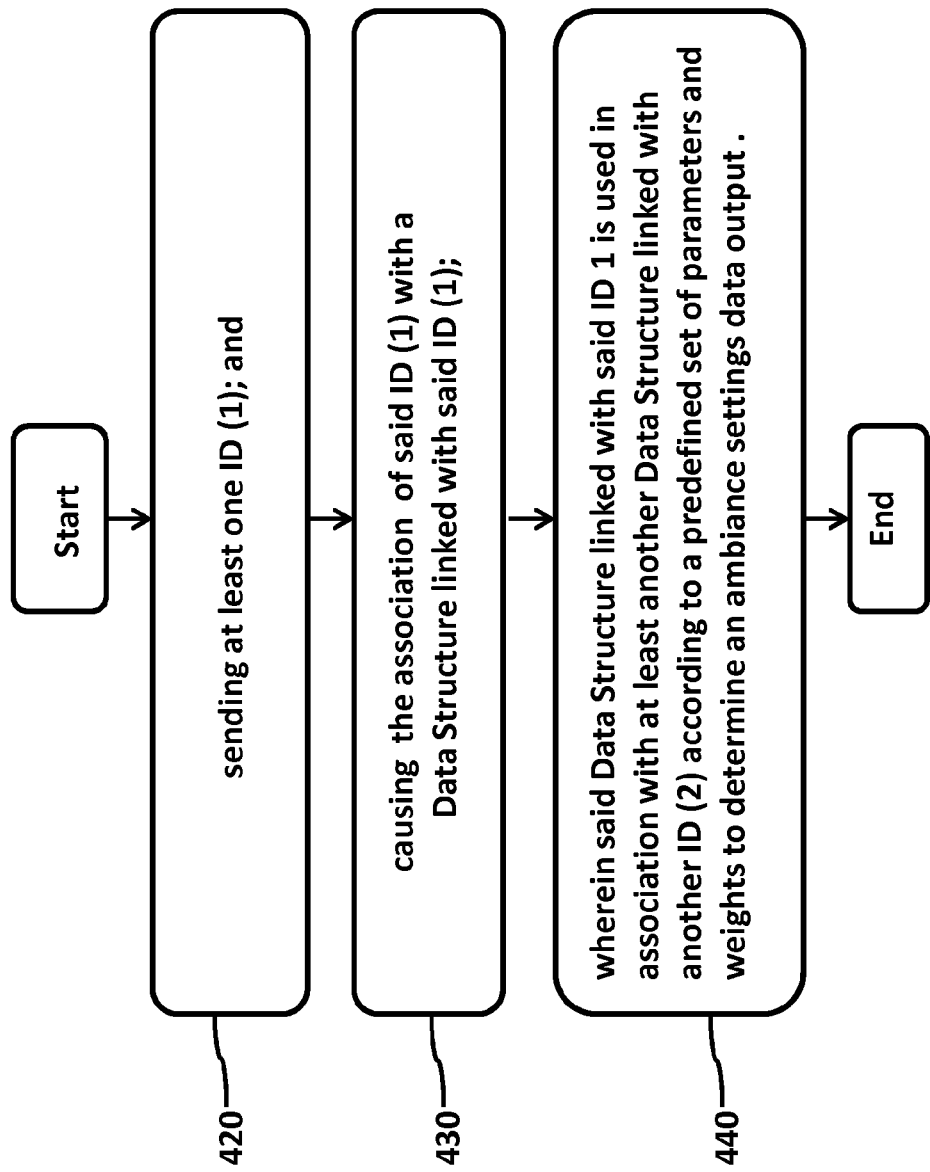
FIG. 4 is an exemplary flow diagram illustrating a process for causing ambiance settings related to an area to at least partially adapt to the data and preferences contained in a data structure associated with a user ID.

FIG. 4 represents a possible method embodiment of the present invention. The method described may comprise: sending at least one ID (1) (420) and causing the association of said ID (1) with a Data Structure linked with said ID (1) (430); wherein said Data Structure linked with said ID (1) is used in association with at least another Data Structure linked with another ID (2) according to a predefined set of parameters and weights to determine an ambience settings data output. As will be discussed with reference to FIG. 5 apparatuses such as an RFID tag can implement the method described in FIG. 4.

Figure 5:
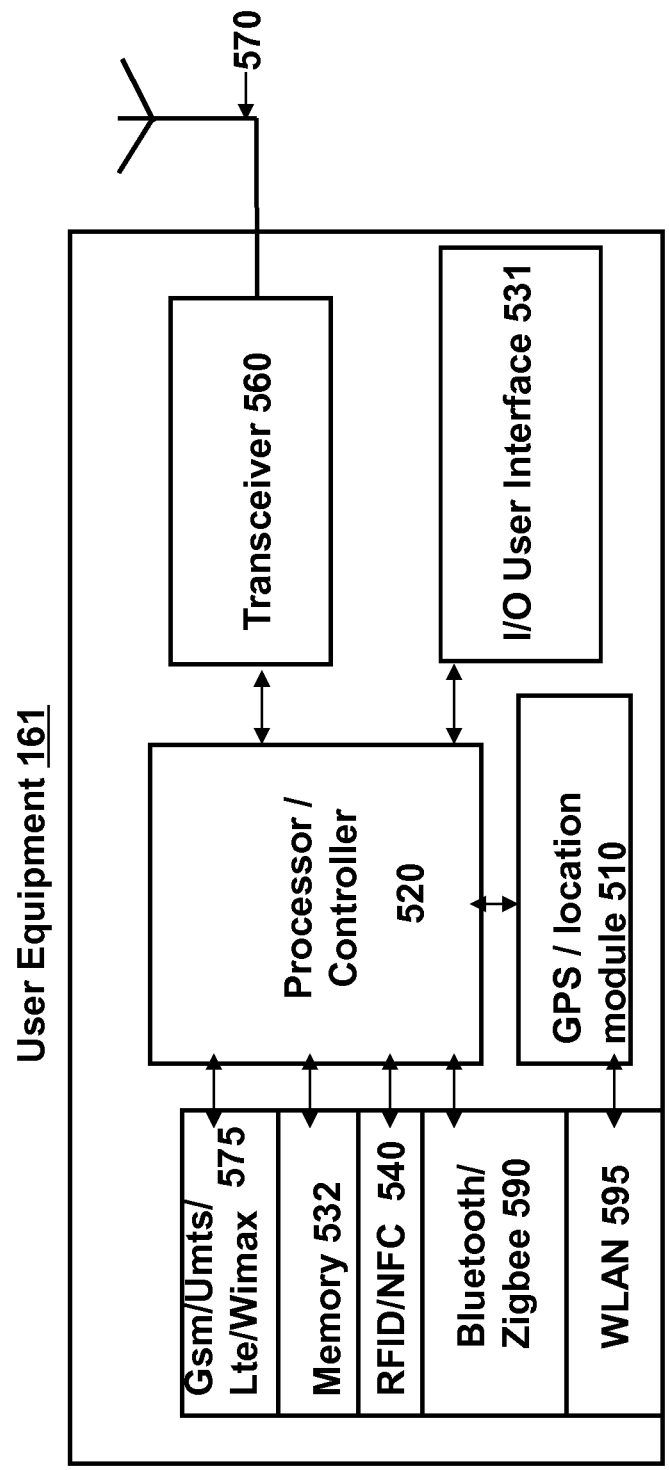
FIG. 5 is a schematic example of a user equipment illustrating various modules that can be used to implement various embodiments of the present invention.

FIG. 5 represents one possible apparatus embodiment of User Equipment (UE) 161. The person skilled in the art will realize that the present invention can be implemented according to embodiments that do not necessitate every module that is described in FIG. 5 that are common of smart phones or computer-like equipment. In addition, the using of a login and a password associated with an ID to access an application running on mobile equipment can make UE 161 or UE 160 interchangeable among users. IDs can be unique to certain users rather than to certain apparatuses.

User Equipment 161 is a general example of a terminal device that users can operate. It can be a traditional smart phone, a personal digital assistant, a laptop computer, an e-book reader, an entertainment console or controller, wearable hardware such as augmented reality headsets, a tablet computer or any other portable device including a transponder such as an RFID tag as long as capable of communicating at least digital information linked with a user ID. The association of a user ID with a location area (such as Area 190) may derive from the relatively short radio horizon of non-cellular wireless standards such as WLAN, Bluetooth, RFID and others. In some cases the check in area is within (or of a size comparable to) the ambience settings area so the IDs that have checked in can be automatically associated with a location area. If the location information associated with an ID needs to be transmitted to a Service Server 100, Second Module 121 can do so. In another implementation, UE 161 may directly communicate with Service Server 100 and provide both ID (1) and the location data of UE 161. A location data of UE 161 transmitting ID (1) can be associated with a location area such as Area 190 by Service Server 100 or by SAA 120.

With reference to RFID/NFC 540 module, apparatuses as simple as an RFID tag embedded in a bracelet can be sufficient to embody the present invention. In this implementation, ambiance settings may simply adjust in Area 190 to account for all the IDs that are checking in and all the IDs that are checking out. An RFID reader, placed in Area 190, may broadcast an encoded radio signal to interrogate the RFID tag. The tag's information can be stored electronically in a non-volatile memory. The RFID tag may include a small RF transmitter and/or a receiver. The tag can receive the message and can reply with its identification information. This can be a unique tag serial number. In the case of the present invention, it can be a code associated with users' unique IDs as ID (1) and ID (2) described in FIG. 1. A database stored in Memory 123 or Memory 102 can associate said individual serial numbers with users' IDs.

The person skilled in the art will realize that even if the invention can be implemented by using an apparatus as simple as an RFID transponder, certain functionalities previously described can be more easily implemented by using apparatuses that are more complex. For example, an input/output module, like I/O User Interface 531, can be used to provide feedback to Service Server 100 or to activate other functionalities described in the present application. I/O User Interface 531 may allow inputting information via a touch screen or a QWERTY keyboard. I/O User Interface 531 may also include a vibrating notification module, a speaker or a monitor (or any combination thereof). Input/output modules can also be a fixture of Area 190 so that different users can share said modules if needed.

RFID tags can be either passive, active or battery assisted passive. An active tag has a battery and can periodically transmit its ID signal. Periodicity can be used to establish a duration value of the permanence of a particular ID in the check in area. A battery assisted passive (BAP) has a small battery on board and can be activated when in the presence of an RFID reader. A passive tag is usually smaller because it has no battery. In this case, the duration of the permanence of IDs within the check in area can be established by using the periodicity of the interrogation by the RFID reader. A passive tag uses the radio energy transmitted by the reader as its energy source. Tags have individual serial numbers and the RFID system design can discriminate several tags that might be within the range of the RFID reader and read them simultaneously.

User Equipment 161 can also comprise an Antenna 570 and a Transceiver 560 capable of transmitting at least an ID (1) to a Shared Ambience Apparatus 120 (SAA) or directly to Service Server 100 via Network Connection 145 and Core Network/Internet 130 when Processor/Controller 520 directs Transmission Module GSM/UMTS/LTE/WiMAX 575 to do so. Transmission Module GSM/UMTS/LTE/WiMAX 575 represents a multimode module capable of connecting to a cellular network via at least one of the mentioned cellular standards or any equivalent standard that standardization bodies may codify in the future.

Modern 3G and 4G cellular standards may produce a significant radio horizon. If the sending of ID (1) occurs directly via Network Connection 145 and Core Network/Internet 130, instead of Wireless Link 141 via a non cellular standard such as WLAN, then said ID (1) can be accompanied by an indication of the whereabouts of said User equipment 161 (such as Area 190) so that Service Server 100 may send ambience settings indications that are pertinent to the particular zone of presence of user of UE 161.

Antenna 570 may support beam forming and/or multiple input multiple output (MIMO) operations. As is known to those skilled in the art, MIMO operations may provide spatial diversity, which is to overcome difficult channel conditions and/or increase channel throughput. Antenna 570 may include antenna tuning and/or impedance matching components, RF power amplifiers, and/or low noise amplifiers. User Equipment 161 can be optimized to support multiple transceivers using multiple wireless standards.

User Equipment 161 may also comprise a GPS/Location Module 510. Said GPS/Location Module can be used for various functions, for example when it recognizes that UE 161 is within Area 190 it can feed the information to Processor/Controller 520 for triggering (manually or automatically) the transmission of ID (1). Alternatively, the transmission of ID (1) can be triggered (automatically or manually) by means of an RF-ID system or other wireless modules like a Bluetooth/Zigbee 590 module or WLAN 595 module. In one implementation, the sending of ID (1) can be triggered via a manual input of user via User Interface 531. For example, user can be given a list of nearby places that are available for check in.

The locationing component of the invention can be advantageously implemented in many different ways. When in closed environments, such as a shopping mall, the location data can be provided via different techniques. For example, choke points or grids, namely location indexing and presence reporting for tagged objects, can be used to provide location data when indoor. Other examples of techniques used to provide location are angle of arrival, time of arrival, received signal strength indication, inertial measurements and ID databases of WLAN access points.

Memory 532 may store ID (1) as well as other data such as user libraries of digital media or digital media files. Memory 532 may also store a software application adapted to enable User Equipment 161 to provide to user the possibility, via User Interface 531, to cause User Equipment 161 to send a coincident digital signal indicating his appreciation (or dislike) for certain ambience settings that are concurrently delivered within Area 190 by Module 122.

Equipment 161 can include at least one Processor/Controller 520 and at least a Memory 532 including computer program instructions. The at least one Processor/Controller 520 can be embodied by any computational or data processing device, such as a central processing unit (CPU) or application specific integrated circuit (ASIC). The at least one Processor/Controller 520 can be implemented as one or a plurality of controllers. Memory 532 may contain application software running on User Equipment 161. The at least one Memory 532 can be any suitable storage device, such as a non-transitory computer-readable medium. For example, a hard disk drive (HDD) or random access memory (RAM) can be used in the at least one Memory 532. The at least one Memory 532 can be on the same chip as the at least one Processor/Controller 520, or may be separate from the at least one Processor/Controller 520. The computer program instructions may be any suitable form of computer program code. For example, the computer program instructions may be a compiled or interpreted computer program. The at least one Memory 532 and computer program instructions can be configured to, with the at least one Processor/Controller 520 to cause a hardware apparatus (for example, User Equipment 161) to perform any process described herein.

FIG. 6 represents a possible embodiment of an Operator Set of Parameters 600. This datagram contains data and preferences related to a person who may have authority over the operation of said Shared Ambience Apparatus 120 (SAA). This person can be the manager of a business enterprise in charge of delivering ambience settings to patrons within Area 190. In another implementation, it can be a homeowner or any other entity with the authority to constrain the output of ambience settings within Area 190, for example a traffic authority agency as explained in a previous example related to augmented reality. Operator Set of Parameters 600 is not an essential element for the invention to work. It is nevertheless a useful instrument if it is desirable to set boundaries to the degree to which IDs checking into Area 190 can influence an algorithm in charge of weighting and mediating among various User Sets of Parameters 300 and determine common ambience settings.

Operator Set of Parameters 600 can be a datagram that largely mirrors User Set of Parameters 300. Column 610 describes non-limiting examples of some possible Ambiance Classes. Column 620 describes Class Preferences namely libraries or details of preferences for each Ambiance Class 610. These preferences may derive from explicit settings of the Operator. For example, in the case of Field 641, a traffic authority may prioritize IDs belonging to public service workers to improve public service efficiency. Operator Set of Parameters 600, under certain conditions, can override preferences related to IDs checking into area 190. Alternatively, Operator Set of Parameters 600 can be used as default settings in absence of IDs in Area 190 that have checked in.

Column 630 describes General Operator Settings. For example operator may want to privilege certain customers by listing their IDs in the Preferred User 631 field so that those users may influence the ambience settings more than others. Operator may also want to privilege a certain clientele that is older or younger than a certain age according to a certain target clientele. He can do that by using a Date of Birth 632 field and by setting his preferences. Operator can also set a preferred range of ages such as patrons who are between 45 and 55 years of age if, for example, this is the most lucrative class of patrons.

Gender 633 field is another example of possible hierarchy among classes of IDs. A clientele of females can be preferred over males, for example. Timers 621 field can indicate that the operator may have different settings over different periods. For example, early in the evening, certain genres can be preferred, for example upbeat music, while late in the evening the preference may change to slow music that couples can enjoy. Timers can also be used to regulate the pace at which the output of digital content may change. For example, an operator may not want the system to be too susceptible to the flow at which patrons may come and go.

Column 640, General Operator Preferences, may list exclusions; for example in a sport bar where patrons are on average adults cartoon program channels can be excluded. Vice versa in a Mc Donald's, where kids are welcome and form a big portion of the clientele, certain channels with questionable shows can be banned. Operator can achieve this by using a Sexual Explicitness 643 field. Field Sexual Explicitness 643 can be used, for example, in relation to digital content that can vary and adapt to various audiences by including or excluding various scenes in a movie as previously described.

A Content Rating 644 field can be used to include or exclude digital content as rated by the various public agencies such as, for example, the Classification and Rating Administration ("CARA"). By using this field, the operator of a public place can exclude movies or shows intended for mature audiences if one or more IDs that have checked in Area 190 belongs to minors.

Without in any way limiting the scope, interpretation, or application of the claims appearing below, a technical effect of one or more of the example embodiments disclosed herein can be the growth in popularity of RFID tags. Such ID tags may be contained, generated or transmitted by a portable apparatus such as a cellular phone, a tablet or can also be embedded in objects such as necklaces or bracelets or even implanted into a body.

Another technical effect of one or more of the example embodiments disclosed herein can be the creation of a new class of technical devices that has been termed Shared Ambience Apparatuses 120 (SAA). It should be understood that under certain conditions, a traditional general-purpose computer, fixed or portable, could be adapted to function as a SAA 120. For example, said computer can be adapted to receive a stream of music from Service Server 100 that is the product of preferences located within Area 190. Users may check in Area 190 by transmitting their ID to said computer via a WLAN or Bluetooth connection. Music boxes attached to said computer could provide the music to patrons.

Embodiments of the present invention can be implemented in software, hardware, application logic or a combination of software, hardware and application logic. If desired, part or all of the software, application logic and/or hardware may reside on a Shared Ambience Apparatus 120 (SAA), on service Server 100, on Workstation 150 or on UE 161 and UE 160. In an example embodiment, the application logic, software or instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or a server, with one example of a computer or server described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions can be optional or can be combined. For example, the data structures in FIG. 3 or FIG. 6 can be simplified to contain only one or just a few data and settings that can be weighed against other data structures belonging to other users.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications that can be made without departing from the scope of the present invention as defined in the appended claims.

What is claimed is:

1. A method, comprising:
receiving a first user ID associated with a location area at a receiving apparatus;
linking said first user ID with a data structure coupled with said first user ID;
receiving a second user ID associated with the same said location area at said receiving apparatus;
linking said second user ID with another data structure coupled with said second user ID;
determining at said receiving apparatus (an) a mediated ambience settings data output for said location area, related to the at least partially concurrent association of said first user ID and said second user ID, using said data structures according to a predefined set of parameters, wherein said set of parameters includes a hierarchy among said data structures parameter associated, at least in part, with permanence within said location area analytics;
and
generating a digital signal for communicating at least part of said mediated ambience settings data output.

2. The method of claim 1 wherein said mediated ambience settings data output is audio digital content such as music.

3. The method of claim 1 wherein said mediated ambience settings data output is a temperature value.

4. The method of claim 1 wherein said mediated ambience settings data output is mixed digital content.

5. The method of claim 1 wherein said mediated ambience settings data output is shared augmented reality.

6. The method of claim 1 wherein said set of parameters further includes (a duration into said location area parameter) a paid premium service parameter.

7. An apparatus, comprising:
at least one processor; and
at least one non-transitory computer-readable medium including computer program code;
the at least one non-transitory computer-readable medium and the computer program code configured to, with the at least one processor, cause the apparatus to perform at least the following:
receiving a first user ID associated with a location area;
linking said first user ID with a data structure coupled with said first user ID;
receiving a second user ID associated with the same said location area;
linking said second user ID with another data structure coupled with said second user ID;
determining (an) a mediated ambience settings data output for said location area related to the at least partially concurrent association of said first user ID and said second user ID using said data structures according to a predefined set of parameters, wherein said set of parameters includes a hierarchy among said data structures parameter associated, at least in part, with permanence within said location area analytics; and
generating a digital signal for communicating at least part of said mediated ambience settings data output.

8. The apparatus of claim 7 wherein said mediated ambience settings data output is audio digital content such as music.

9. The apparatus of claim 7 wherein said mediated ambience settings data output is a temperature value.

10. The apparatus of claim 7 wherein said mediated ambience settings data output is mixed digital content.

11. The apparatus of claim 7 wherein said mediated ambience settings data output is shared augmented reality.

12. The apparatus of claim 7 wherein said set of parameters further includes (a duration into said location area parameter) a paid premium service parameter.

13. A computer software system having a set of instructions stored in a non-transitory computer-readable medium for controlling at least one general-purpose digital computer in performing functions comprising a set of instructions formed into each of a plurality of modules, each modules comprising:
a process for receiving a first user ID associated with a location area;
a process for linking said first user ID with a data structure coupled with said first user ID;
a process for receiving a second user ID associated with the same said location area;
a process for linking said second user ID with another data structure coupled with said second user ID;
a process for determining (an) a mediated ambience settings data output for said location area related to the at least partially concurrent association of said first user ID and said second user ID using said data structures according to a predefined set of parameters, wherein said set of parameters includes a parameter associated, at least in part, with permanence within said location area analytics; and
a process for generating a digital signal for communicating at least part of said mediated ambience settings data output.

14. The computer software system of claim 13 wherein said mediated ambience settings data output is audio digital content such as music.

15. The computer software system of claim 13 wherein said mediated ambience settings data output is a temperature value.

16. The computer software system of claim 13 wherein said mediated ambience settings data output is mixed digital content.

17. The computer software system of claim 13 wherein said mediated ambience settings data output is shared augmented reality.

18. The computer software system of claim 13 wherein said set of predefined parameters includes (a duration into said location area parameter) a paid premium service parameter.

19. An apparatus comprising:
means for handing over a first user ID associated with a location area (coupled with a data structure) wherein said first user ID is coupled with a data structure that is concurrently used, at least partially, in conjunction with at least another data structure coupled with another second user ID associated with the same said location area to determine, according to a predefined set of parameters, a mediated ambience settings data output for said location area (within which said apparatus is located) wherein said predefined set of parameters includes a parameter associated, at least in part, with permanence within said location area analytics.

20. The apparatus of claim 19 further comprising means for determining the location of said apparatus.

* * * * *

UNITED STATES PATENT AND TRADEMARK OFFICE
CERTIFICATE OF CORRECTION

PATENT NO. : 8,489,119 B1
APPLICATION NO. : 13/572617
DATED : July 16, 2013
INVENTOR(S) : Federico Fraccaroli It is certified that error appears in the above-identified patent and that said Letters Patent is hereby corrected as shown below:

In the Claims

Claim 1, Column 17, line 11, remove "(an)" to read: "..receiving apparatus a mediated..";

Claim 6, Column 17, line 32, remove "(a duration into said location area parameter)" to read: "...further includes a paid premium service parameter.";

Claim 7, Column 17, line 49, remove "(an)" to read: "..determining a mediated ambience..";

Claim 12, Column 18, line 6, remove "(a duration into said location area parameter)" to read: "..further includes a paid premium service parameter.";

Claim 13, Column 18, line 21, remove "(an)" to read: "..determining a mediated..";

Claim 18, Column 18, lines 46 and 47, remove "(a duration into said location area parameter)" to read: "..includes a paid premium service parameter.";

Claim 19, Column 18, line 51, remove "(coupled with a data structure)" to read: "..location area wherein said..";

Claim 19, Column 18, line 58, remove "(within which said apparatus is located)" to read: "..location area wherein said predefined..".

Signed and Sealed this
Twenty-ninth Day of October, 2013

Teresa Stanek Rea
*Deputy Director of the United States Patent and Trademark Office*